United States Patent

[11] 3,612,712

| [72] | Inventors | Feodor Kanger;<br>Werner R. Strub, Montreal, Quebec, both of Canada |
|---|---|---|
| [21] | Appl. No. | 884,205 |
| [22] | Filed | Dec. 11, 1969 |
| [45] | Patented | Oct. 12, 1971 |
| [73] | Assignee | Dominion Engineering Works, Limited<br>Lachine, Quebec, Canada |
| [32] | Priority | Dec. 13, 1968 |
| [33] | | Canada |
| [31] | | 37,707 |

[54] HYDRAULIC MACHINE STRUCTURE
7 Claims, 3 Drawing Figs.

[52] U.S. Cl. .................................................... 415/110, 415/219
[51] Int. Cl. ..................................................... F01d 11/00
[50] Field of Search .......................................... 415/219, 110

[56] References Cited
UNITED STATES PATENTS

| 3,367,628 | 2/1968 | Fitton ........................... | 415/110 |
| 3,529,984 | 9/1970 | Scalzo et al. .................. | 415/110 |

*Primary Examiner*—C. J. Husar
*Attorneys*—Raymond A. Eckersley, Frank L. Neuhauser, Oscar B. Waddell and Joseph B. Forman ABSTRACT: In large turbo-hydraulic machines having a radially outer speed ring for conveying water into or from the machine and stationary structure within the speed ring to contain the machine runner, precise machining of the speed ring is avoided by providing an annular array of spaced axially facing support pads on the speed ring, which are levelled to give a planar support datum for the inner stationary structure; and providing an auxiliary radially extending seal ring welded to the speed ring, to provide sealing engagement with the inner stationary structure.

FEODOR RANGER + WERNER A. STRUB INVENTOR.

BY R.A.Eckersley
AGENT

HYDRAULIC MACHINE STRUCTURE

This invention is directed to an improved hydraulic turbomachine, and to a method of erecting the machine.

In the manufacture and erection of hydraulic turbomachines such as Francis turbines the size of many of these machines is such that machining of assembled components may not be readily undertaken by the manufacturer in his plant owing to the limitation in size of individual components which may readily be transported by rail to the site of installation.

In a machine of the type such as a Francis turbine or a centrifugal pump having a stay ring to which the casing is welded, generally on the site, the size of the stay ring often requires that it be cast or fabricated in segments. Owing to the need for precisely locating stationary components such as the head cover and lower casing portions within the stay ring it has been customary to precisely machine axial bores and sealing faces perpendicular to the axis of the stay ring for the assembly of the additional or intermediate stationary components therein.

The present invention provides an improved stay ring structure wherein the need to precisely machine internal bores or sealing faces of the stay ring to receive the intermediate structure is eliminated, by the provision of axial locating means to permit precise axial positioning of the intermediate structure, and annular sealing means to provide effective sealing between the improved stay ring and the intermediate stationary structural portions of the machine. In addition, the present invention provides a method of erecting the improved stationary structure of the machine whereby precise and rapid erection of the improved structure may be carried out.

One of the particular advantages afforded by the improved method and structure is that onsite positioning and embedding of the stay ring with its associated casing is simplified by removing the need to preserve precise location and uniformity of the stay ring bores and sealing surfaces.

The present invention thus provides a method of erecting the stationary structure for a large turbohdraulic machine to receive a runner rotatably mounted therein, including the steps of erecting the stay ring portion of the machine in a secure, substantially oriented and levelled condition, attaching axial locating means thereto, establishing a datum plane and adjusting the axial locating means to the datum plane to provide axial location for an intermediate portion of the stationary structure, and securing an annular seal ring to the stay ring portion in inward extending relation to the runner main axis for sealing engagement with the intermediate portion of the machine, whereby precise positioning of the intermediate portion of the stationary structure relative to the runner main axis is provided.

The invention thus provides a turbohydraulic machine having a runner rotatably mounted within a stay ring portion and at least one intermediate stationary portion secured to the stay ring portion in accurately defined radial and axial relation therewith, the machine including adjustable pad means axially interposed between adjacent faces of the stay ring portion and the intermediate portion to provide precise relative axial positioning therebetween, and annular seal ring means secured to one of the portions extending in sealing relation with the other portion whereby leakage of working liquid between the portions is substantially prevented.

Certain embodiments of the present invention are described, reference being had to the accompanying drawings wherein.

Figure 1:
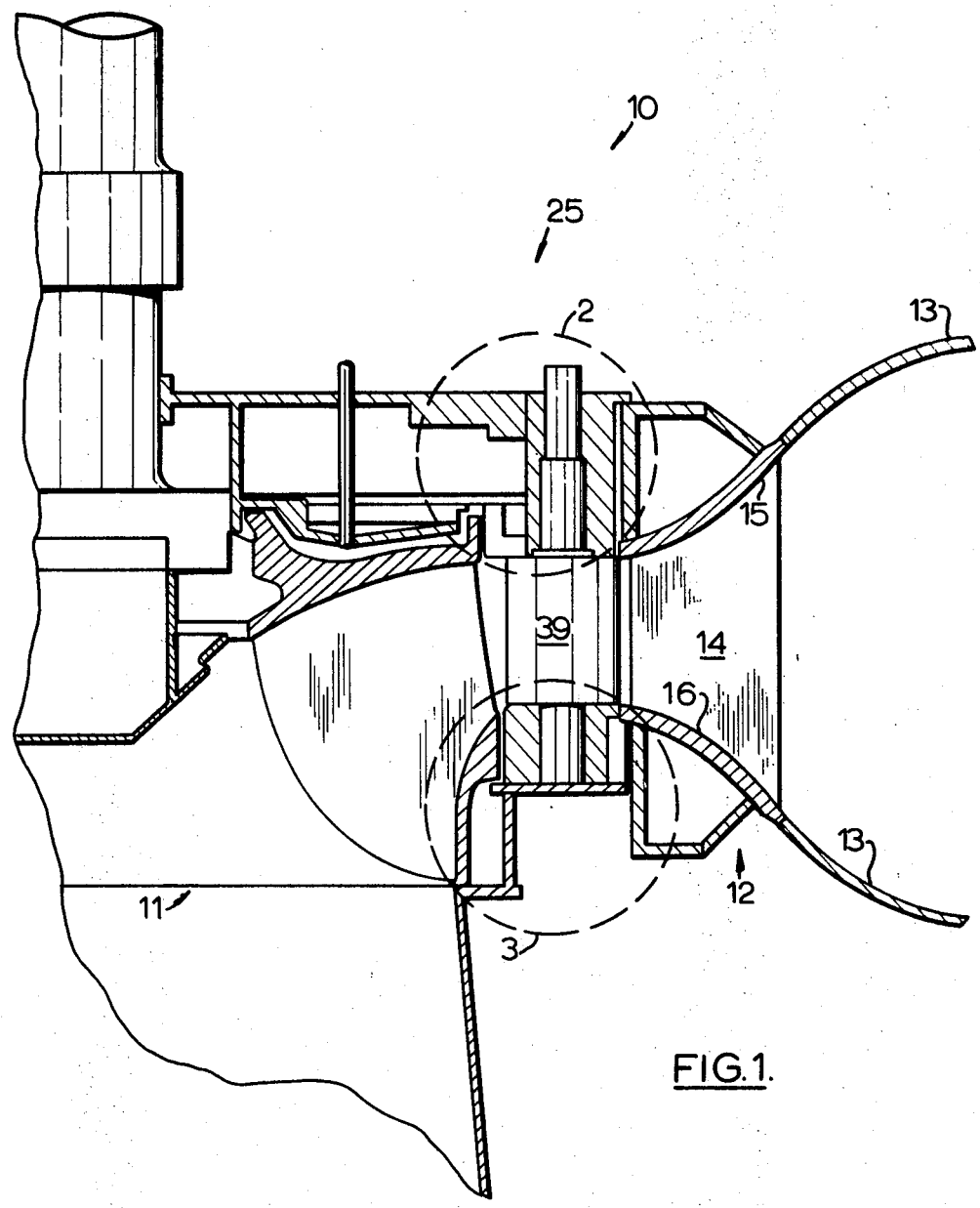
FIG. 1 is a partial diametral elevation of a Francis turbine according to the present invention.
Figure 2:
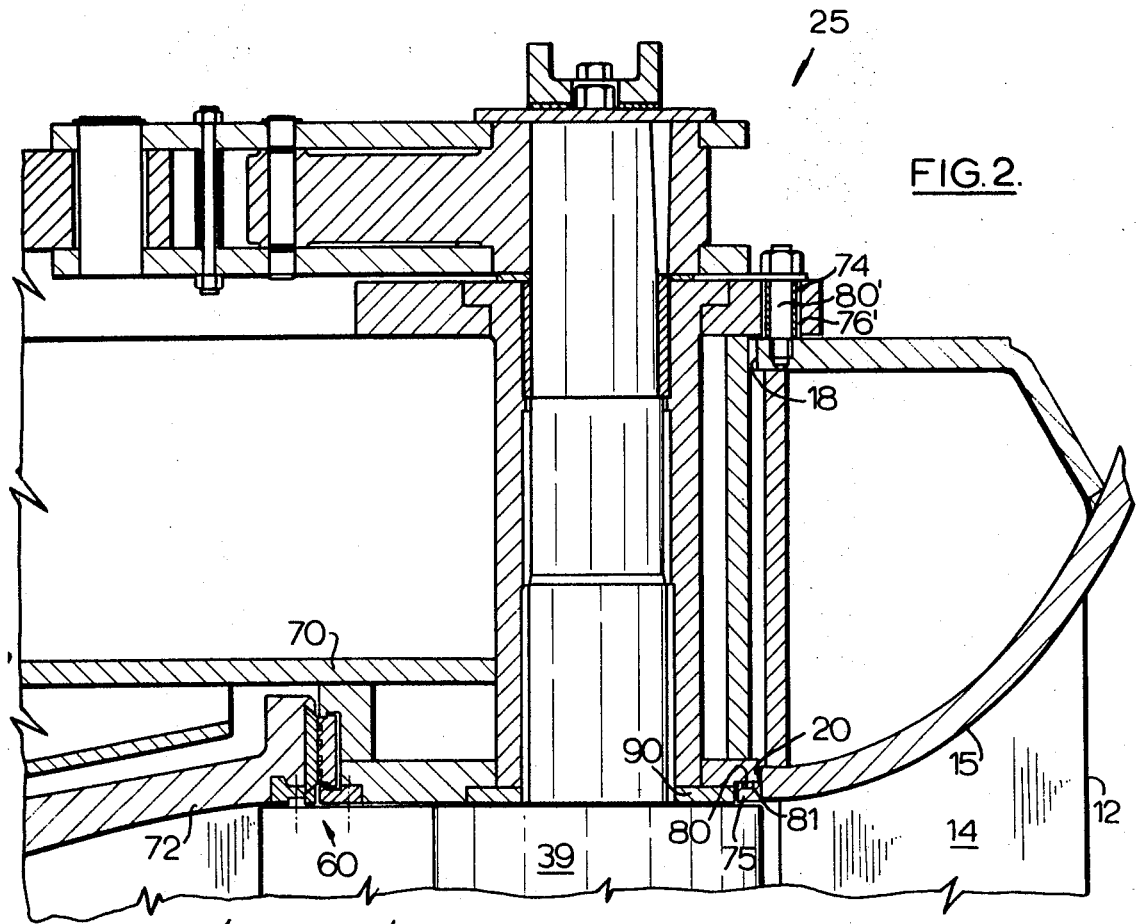
FIG. 2 is an enlarged detail of the portion 2 of FIG. 1.
Figure 3:
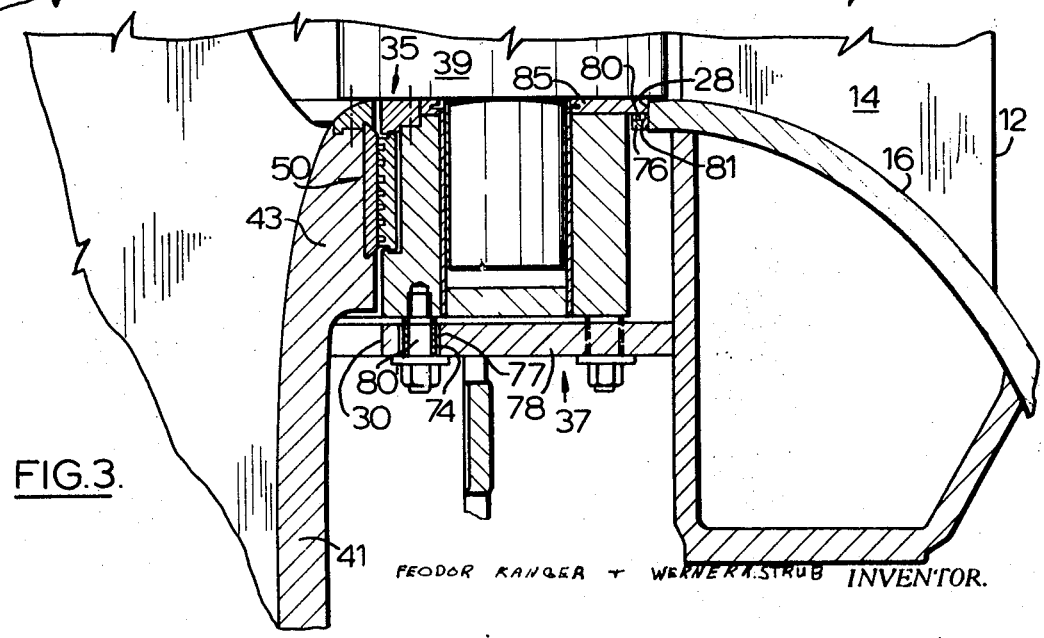
FIG. 3 is an enlarged detail of the portion 3 of FIG. 1.

Referring first to FIG. 1 there is illustrated a turbine 10 having a runner 11 located within a speed or stay ring 12, and showing a portion 13 of an annular casing welded thereto. The speed ring 12 is provided with guide vanes 14 extending between upper and lower flange plates 15, 16, the plates 15, 16 being segments of an annulus extending substantially normal to the main axis of the runner.

Referring also to the other figures of the drawings, the speed ring 12 is illustrated as being fabricated from cut and welded plate to provide bores 18 and 20 within which the head cover 25 is located. The lower portion of the speed ring 12 is provided with bores 28 and 30 to receive a skirt high-pressure edge seal 35, together with bearing housings 37 for a plurality of adjustable guide vanes 39.

The runner of the machine is provided with a skirt or band shroud 41 having a high-pressure edge portion 43 in sealing relation with the stationary portions of the machine by way of the seal 50, which does not constitute a part of the present invention.

A similar upper seal 60 is provided between a portion 70 of the head cover and the runner crown shroud 72.

Intermediate portions of the machine including the guide vanes 39 and its respective upper and lower bearings, and the stationary portions of the seals 50 and 60 are secured to the speed ring 12 by means of axially adjustable pads 74 or sleeves 74' and annular seal rings 75, 76 which are welded to the respective flame cut bores 20, 28 of the stay ring 12.

The upper or head cover levelling pads 74 are illustrated as being threadably mounted at 76' to the head cover 25. In the case of the lower pads 74 these are threadably mounted at 77 to a plate portion 78 of the stay ring 12. Pullup bolts 80' and nuts secure the intermediate stationary structures in desired radial and axial relation to the stay ring 12. Axial adjustment is obtained by relative rotation of the threaded sleeves 74.

Sealing between the intermediate stationary portions and the respective bores 20, 28 is provided by the respective seal rings 75, 76 shown welded to the stay ring and having a resilient sealing member 80 located in respective slots 81.

In erecting the turbine the stay ring 12 is assembled on jacks or other suitable supports and the stay ring, portions 13 of which are shown, is welded thereto, the completed assembly being then embedded in concrete or otherwise suitably anchored.

A main axis wire is then located substantially centrally of the stay ring and casing, defining the runner main axis.

Referring first to the lower portion of the intermediate band housing, the sleeve pads 74 are threadably inserted in the plate 78 of the stay ring, and adjusted to provide a plurality of support surfaces at the upper ends thereof lying in a common plane normal to the axis of the runner, as defined by the wire (not shown). The intermediate stationary portion including portions of the seal assembly 35 and the lower bearings of the guide vanes 39 are then positioned in supported relation upon the sleeves 74 or equivalent faced pads and pulled down by means of the studs 80' and nuts to a secured and locked position.

Sealing between the stay ring and the intermediate portion is then effected by securing the seal ring 76 in coaxial sealing relation against the flange member 85, and then welding the ring 76 to the surface of the bore 28.

Similarly, in relation to the head cover stationary portions, the pad sleeves 74 which are shown threadably mounted in the head cover are adjusted into bearing contact against the adjacent portion of the stay ring until the head cover is located in the desired reference plane at the required radial and axial position relative to the runner main axis. The seal ring 75 is then brought into sealing relation with the flange 90 of the head cover and welded to the bore 20 of the stay ring.

It is contemplated that the threaded-type pads 74 may be used as jacking means, to level the intermediate housing portions, prior to pulling down and securing by means of studs 80 and nuts.

It will be understood that the intermediate housing portions are centered relative to the desired runner main axis prior to completion of the step of axial positioning.

It will also be understood that simple distance pads or pieces may be substituted for the threaded sleeve pads 74. Axial adjustment of the alternative pad embodiment is then effected by grinding the respective top or axial faces of the pads to conform with the predetermined reference plane.

It will be seen that a number of unobvious advantages are obtained by the subject invention. Thus by obviating the need to initially assemble the individual segments of the stay ring for the purpose of machining the bores thereof, it is necessary only to make provision for securing the adjacent segments, while the respective bores 18, 28 and 30 may be flame-cut. This has particular advantage during the weldment and encasing of the stay ring and the associated casing when it is difficult to maintain precise alignment and avoid relative warpage of different portions of the ring. The provision of adjustable securing means between the intermediate portion of the stationary structure and the stay ring permits correction for such warpage, while the initial costs of manufacturing the stay ring are also reduced by the elimination of machined bores.

In addition, under the conditions prevailing at the site the erection and alignment of the machine is simplified to the point where relatively minor local adjustments only are necessary to provide the essential alignment between rotating and stationary components of the machine, and to secure intermediate stationary components in precisely determined relation with other stationary structure.

What I claim as new and desire to secure by Letters Patent of the United States is:

1. A turbomachine having an annular stationary housing, a runner mountable therein for rotation on an axis extending substantially normal to the annulus, intermediate stationary structure positioned between the annulus and the runner in close cooperating relation with the runner and having radial clearance from the annulus relative to the main axis thereof, axial locating means connecting the intermediate structure with the annular housing, being adjustable to permit the axial location of a reference plane normal to the runner main axis, and positionable annular sealing means extending between said intermediate structure and said housing whereby leakage of working fluid through the radial clearance may be substantially precluded.

2. The machine as claimed in claim 1 having an outward extension for working fluid connecting with annular passage means in said housing, the passage means extending between axially spaced portions of said intermediate structure, and a first and a second said sealing means in respective sealing relation with the axially spaced intermediate portions.

3. A turbohydraulic machine having a runner rotatably mounted within a speed ring, and at least one intermediate stationary portion secured to said speed ring portion in accurately defined radial and axial relation therewith, said machine including adjustable pad means axially interposed between adjacent faces of said speed ring portion and said intermediate portion to provide precise relative axial positioning therebetween, and annular seal ring means secured to one said portion extending in sealing relation with the other said portion whereby leakage of working liquid between said portions is substantially prevented.

4. The machine as claimed in claim 3 wherein said intermediate stationary portion comprises a head cover.

5. The machine as claimed in claim 3 wherein said intermediate portion comprises a seal ring about the skirt shroud of said runner.

6. The machine as claimed in claim 3, wherein said adjustable pad means includes a plurality of spacer pads in circumferential array relative to the main axis of said runner, the top faces being ground to a common plane to provide a reference support plane for a said intermediate portion.

7. The machine as claimed in claim 3 wherein said adjustable pad means includes a plurality of axially adjustable threaded jacking means in spacing relation between said stay ring portion and said intermediate portion.